(12) United States Patent
Zheng et al.

(10) Patent No.: US 11,966,994 B2
(45) Date of Patent: Apr. 23, 2024

(54) BLOCKCHAIN-BASED METHOD AND SYSTEM FOR PROCESSING TRAFFIC VIOLATION EVENT

(71) Applicants: Inventec Appliances (Pudong) Corporation, Shanghai (CN); Inventec Appliances (Shanghai) Co. Ltd., Shanghai (CN); Inventec Appliances Corp., New Taipei (TW)

(72) Inventors: Yong-Ping Zheng, Shanghai (CN); Shih-Kuang Tsai, New Taipei (TW)

(73) Assignees: INVENTEC APPLIANCES (PUDONG) CORPORATION, Shanghai (CN); INVENTEC APPLIANCES (SHANGHAI) CO. LTD., Shanghai (CN); INVENTEC APPLIANCES CORP., New Taipei (TW)

( * ) Notice: Subject to any disclaimer, the term of this patent is extended or adjusted under 35 U.S.C. 154(b) by 499 days.

(21) Appl. No.: 16/919,905

(22) Filed: Jul. 2, 2020

(65) Prior Publication Data
US 2021/0042869 A1 Feb. 11, 2021

(30) Foreign Application Priority Data
Aug. 8, 2019 (CN) .......................... 201910728768.3

(51) Int. Cl.
*G06Q 30/00* (2023.01)
*G06Q 50/26* (2012.01)
(Continued)

(52) U.S. Cl.
CPC ....... *G06Q 50/26* (2013.01); *G08G 1/096791* (2013.01); *H04L 9/32* (2013.01)

(58) Field of Classification Search
None
See application file for complete search history.

(56) References Cited

U.S. PATENT DOCUMENTS 6,188,329 B1 * 2/2001 Glier .................. G08G 1/164
7,359,821 B1 * 4/2008 Smith .................. G01L 5/0052
702/113

(Continued)

FOREIGN PATENT DOCUMENTS

| JP | 2019007954 A | * | 1/2019 | ............. G01C 21/34 |
| JP | 2019146137 A | * | 8/2019 | ............... G08G 5/00 |
| JP | 2021056759 A | * | 4/2021 | ........... B64C 39/024 |

OTHER PUBLICATIONS

Yao-Tsung Yang et al. "Blockchain-Based Traffic Event Validation and Trust Verification for VANETs." (Mar. 25, 2019). Retrieved online Sep. 19, 2022. https://ieeexplore.ieee.org/stamp/stamp.jsp?arnumber=8663370 (Year: 2019).*

(Continued)

*Primary Examiner* — James A Reagan
(74) *Attorney, Agent, or Firm* — Muncy, Geissler, Olds & Lowe, P.C.

(57) ABSTRACT

The present invention provides a blockchain-based method and system for processing a traffic violation event. The method includes: obtaining traffic violation reporting information provided by a first vehicle node stored in a blockchain; obtaining an associated evidence data identifier in the traffic violation reporting information; obtaining, according to the evidence data identifier, evidence data provided by a second vehicle node stored in the blockchain; and determining, according to the traffic violation reporting information and the associated evidence data, whether the traffic violation reporting information is valid. In the present invention, each vehicle node in the blockchain automatically collects data of a traffic violation event, so that credible traffic (Continued)

violation determining is completed based on an intelligent contract, and credibility and tamper resistance of traffic violation determining is improved based on recording information of a plurality of associated blockchain nodes.

8 Claims, 11 Drawing Sheets

(51) Int. Cl.
*G08G 1/0967* (2006.01)
*H04L 9/32* (2006.01)

(56) References Cited

U.S. PATENT DOCUMENTS

| | | | | |
|---|---|---|---|---|
| 9,098,956 | B2* | 8/2015 | Lambert | G08G 1/16 |
| 9,280,857 | B2* | 3/2016 | Lambert | H04L 67/10 |
| 9,760,426 | B2* | 9/2017 | LeMond | G06F 21/552 |
| 9,910,727 | B2* | 3/2018 | Lemond | G06F 11/0751 |
| 10,127,810 | B2* | 11/2018 | Durie, Jr. | G08G 1/205 |
| 10,198,949 | B2* | 2/2019 | Becker | H04L 9/0637 |
| 10,318,828 | B2* | 6/2019 | Hampiholi | G08G 1/205 |
| 10,504,302 | B1* | 12/2019 | Chavez | H04W 4/90 |
| 10,540,833 | B1* | 1/2020 | Gingrich | G06Q 40/08 |
| 10,713,727 | B1* | 7/2020 | Floyd | H04L 9/0637 |
| 10,719,501 | B1* | 7/2020 | Leise | G06Q 40/025 |
| 10,719,884 | B2* | 7/2020 | Hu | G06Q 50/182 |
| 10,719,886 | B1* | 7/2020 | Konrardy | G07C 5/0808 |
| 10,796,393 | B2* | 10/2020 | Messerges | G06Q 50/265 |
| 10,803,540 | B2* | 10/2020 | Schuler | G06F 16/27 |
| 10,835,825 | B2* | 11/2020 | Witchey | H04L 9/3239 |
| 10,868,667 | B2* | 12/2020 | Qi | H04W 12/06 |
| 10,872,381 | B1* | 12/2020 | Leise | H04W 4/38 |
| 10,891,694 | B1* | 1/2021 | Leise | H04L 9/3239 |
| 11,049,188 | B2* | 6/2021 | Hu | G06Q 50/30 |
| 11,113,769 | B2* | 9/2021 | Hu | G06Q 50/30 |
| 11,386,498 | B1* | 7/2022 | Leise | G06N 20/00 |
| 11,416,942 | B1* | 8/2022 | Leise | G06N 20/00 |
| 11,442,918 | B2* | 9/2022 | Leise | G06F 16/219 |
| 2003/0028404 | A1* | 2/2003 | Herron | G06Q 40/02 705/4 |
| 2004/0088090 | A1* | 5/2004 | Wee | G08G 1/205 701/33.4 |
| 2004/0111301 | A1* | 6/2004 | Wahlbin | G06Q 40/08 705/4 |
| 2006/0200307 | A1* | 9/2006 | Riess | G06V 20/54 701/117 |
| 2012/0034876 | A1* | 2/2012 | Nakamura | H04L 9/321 455/66.1 |
| 2013/0080050 | A1* | 3/2013 | McKitterick | G01S 7/4004 701/534 |
| 2015/0088335 | A1* | 3/2015 | Lambert | G06N 7/01 701/1 |
| 2015/0178578 | A1* | 6/2015 | Hampiholi | G08G 1/166 348/149 |
| 2015/0310676 | A1* | 10/2015 | Lambert | G08G 1/16 709/204 |
| 2016/0198548 | A1* | 7/2016 | Monaci | H05B 47/11 315/297 |
| 2016/0350165 | A1* | 12/2016 | LeMond | G06F 11/0787 |
| 2017/0263120 | A1* | 9/2017 | Durie, Jr. | G08G 1/205 |
| 2017/0344415 | A1* | 11/2017 | Lemond | G06F 11/0751 |
| 2018/0018723 | A1* | 1/2018 | Nagla | H04L 63/08 |
| 2018/0218454 | A1* | 8/2018 | Simon | H04L 9/3239 |
| 2018/0218455 | A1* | 8/2018 | Kolb | H04L 9/0637 |
| 2018/0337769 | A1* | 11/2018 | Gleichauf | H04L 9/0637 |
| 2018/0345981 | A1* | 12/2018 | Ferguson | G07C 5/0808 |
| 2018/0374283 | A1* | 12/2018 | Pickover | G07C 5/085 |
| 2019/0039545 | A1* | 2/2019 | Kumar | G07C 5/008 |
| 2019/0044700 | A1* | 2/2019 | Leddy | H04L 9/3239 |
| 2019/0068913 | A1* | 2/2019 | Kim | G08G 1/0175 |
| 2019/0287199 | A1* | 9/2019 | Messerges | G06F 16/27 |
| 2019/0304027 | A1* | 10/2019 | Hu | G06Q 40/08 |
| 2019/0333181 | A1* | 10/2019 | Simpson | G06Q 30/0283 |
| 2019/0354694 | A1* | 11/2019 | Azoulay | H04L 9/0637 |
| 2020/0010080 | A1* | 1/2020 | Weldemariam | H04W 4/46 |
| 2020/0026289 | A1* | 1/2020 | Alvarez | G07C 5/085 |
| 2020/0034552 | A1* | 1/2020 | Korres | H04L 67/53 |
| 2020/0145191 | A1* | 5/2020 | Qi | H04L 9/3247 |
| 2020/0160454 | A1* | 5/2020 | Hu | G06Q 20/3829 |
| 2020/0175605 | A1* | 6/2020 | Hu | G06F 16/27 |
| 2020/0177373 | A1* | 6/2020 | Komandur | H04L 9/3247 |
| 2020/0233940 | A1* | 7/2020 | Edwards | H04L 9/0637 |
| 2021/0297268 | A1* | 9/2021 | Weng | H04L 9/0838 |
| 2021/0304317 | A1* | 9/2021 | Leise | G06F 16/29 |
| 2021/0319129 | A1* | 10/2021 | Dutta | G06Q 50/30 |
| 2021/0326992 | A1* | 10/2021 | Leise | H04L 9/3249 |
| 2021/0334906 | A1* | 10/2021 | Hu | G06Q 50/26 |
| 2021/0342946 | A1* | 11/2021 | Leise | G06Q 20/4015 |
| 2022/0036465 | A1* | 2/2022 | Fields | H04L 9/32 |
| 2022/0180449 | A1* | 6/2022 | Leise | H04L 63/101 |

OTHER PUBLICATIONS

Paula Fraga-Lamas et al. "A Review on Blockchain Technologies for an Advanced and Cyber-Resilient Automotive Industry." (Jan. 2019). Retrieved online Sep. 19, 2022. www.researchgate.net/publication/330644270_A_Review_on_Blockchain_Technologies_for_an_Advanced_and_Cyber-Resilient_Automotive_Industry (Year: 2019).*

Luis A. Cintron. "Modeling a Consortium-based Distributed Ledger Network with Applications for Intelligent T Applications for Intelligent Transportation Infrastructure." (Mar. 22, 2019). Retrieved online Sep. 19, 2022. https://scholar.afit.edu/cgi/viewcontent.cgi?article=3253&context=etd (Year: 2019).*

* cited by examiner

BLOCKCHAIN-BASED METHOD AND SYSTEM FOR PROCESSING TRAFFIC VIOLATION EVENT

BACKGROUND

Technical Field

The present invention relates to the technical field of data processing, and, to a blockchain-based method and system for processing a traffic violation event.

Related Art

In the prior art, traffic violations are mainly collected through electronic police capture, on-site enforcement by a law enforcement officer, or submission of a picture or a video by public using a reporting application (APP) followed by determining by a law enforcement officer, etc. An evidence for determining a traffic violation event responsibility generally originates from a site accident situation, a site image that may be collected from a public device, description of a party, testimony of a witness, or the like. However, an existing manner of processing a traffic violation event has the following problems.

(1) For electronic police capture, during collection of traffic violation event data, since the electronic police is at a fixed position, full coverage cannot be implemented and traffic violations at some positions cannot be collected, and the electronic police collects data only in a form of an image.

(2) For on-site law enforcement by a law enforcement officer, the law enforcement officer may have a misjudgement. In an accident, since a party reverses a self-negotiation result as a result of being unfamiliar with a processing procedure or being worried about a traffic violation responsibility, and there may be no witness or a witness is unwilling to provide an evidence as a result of being afraid to be reported, after processing of a traffic violation, collected evidences may be tampered, and there is no credible evidence record. Therefore, it is likely to result in a dispute, impeding processing of a traffic violation event by a law enforcement officer.

(3) For public reporting, manual uploading to an APP by a user is required for public reporting, which is inconvenient, and police needs to determine whether the report is valid through analysing, resulting in very low processing efficiency.

Therefore, a credible processing mechanism for traffic violation determining and evidence collection cannot be implemented in the prior art.

SUMMARY

The present invention provides a blockchain-based method and system for processing a traffic violation event, to automatically process a traffic violation event, thereby improving credibility of processing a traffic violation event.

The present invention provides a blockchain-based method for processing a traffic violation event, including the following steps:
  obtaining traffic violation reporting information provided by a first vehicle node stored in a blockchain;
  obtaining an associated evidence data identifier in the traffic violation reporting information;
  obtaining, according to the evidence data identifier, evidence data provided by a second vehicle node stored in the blockchain; and
  determining, according to the traffic violation reporting information and the associated evidence data, whether the traffic violation reporting information is valid.

In an embodiment of the present invention, optionally, the determining whether the traffic violation reporting information is valid includes the following steps:
  determining whether a quantity of second vehicle nodes providing the associated evidence data is greater than or equal to a pre-set first threshold; and
  if yes, determining that the traffic violation reporting information is valid.

Optionally, after the determining whether a quantity of second vehicle nodes providing the evidence data is greater than or equal to a pre-set first threshold, the method further includes the following steps:
  if the quantity of second vehicle nodes providing the evidence data is less than the pre-set first threshold, sending the traffic violation reporting information to an event auditor terminal; and
  determining validity of the traffic violation reporting information according to an auditing result of the event auditor terminal.

Optionally, the sending the traffic violation reporting information to an event auditor terminal includes the following steps:
  identifying vehicle identification information in the traffic violation reporting information, and after anonymous processing is performed on the vehicle identification information, sending the traffic violation reporting information obtained after anonymous processing to the event auditor terminal.

Optionally, if the quantity of second vehicle nodes providing the evidence data is less than the pre-set first threshold, the traffic violation reporting information is sent to a plurality of event auditor terminals; and
  the determining validity of the traffic violation reporting information according to an auditing result of the event auditor terminal includes the following steps:
  determining whether a quantity of received auditing results of traffic violation confirmation is greater than a pre-set second threshold; and
  if yes, determining that a traffic violation event in the traffic violation reporting information is valid; or
  otherwise, determining that a traffic violation event in the traffic violation reporting information is invalid.

Optionally, the traffic violation reporting information includes traffic violation event information, information about a vehicle in a traffic violation, and an associated evidence data identifier, the evidence data includes an evidence data identifier, traffic violation event information, and information about a vehicle in traffic violation that are of the evidence data, and the traffic violation event information includes at least one of a traffic violation event time, a traffic violation event position, and a traffic violation event type.

Optionally, the method may further include the following steps:
  collecting, by the first vehicle node, a road image, and sending a proving request to the second vehicle node when a traffic violation event is detected in the road image, the proving request including information about a to-be-proved vehicle in traffic violation and information about a to-be-proved traffic violation event;
  collecting, by the second vehicle node receiving the proving request, an image of the to-be-proved vehicle in traffic violation, and determining whether there is a traffic violation event consistent with the proving request;

if yes, storing, by the second vehicle node, the evidence data in the blockchain, and sending the evidence data identifier to the first vehicle node; and storing, by the first vehicle node, the traffic violation reporting information in the blockchain.

Optionally, when the first vehicle node stores the traffic violation reporting information in the blockchain, the method further includes: after encrypting information about the first vehicle node in the traffic violation reporting information using a private key, storing, by the first vehicle node, the traffic violation reporting information in the blockchain.

Optionally, the method further includes a step of delivering a traffic violation event determining rule to each vehicle node.

Each vehicle node determines, according to the traffic violation event determining rule, whether a traffic violation event is detected.

Optionally, after the determining that the traffic violation reporting information is valid, the method further includes the following steps:

counting a number of second vehicle nodes providing an evidence material; and allocating, according to a pre-set point allocation rule for vehicle reporting and vehicle proving, award points to the first vehicle node and the second vehicle node that provides the evidence material.

Optionally, after the determining that the traffic violation reporting information is valid, the method further includes the following steps:

processing a vehicle in traffic violation according to a pre-set traffic violation processing rule and storing a processing result in the blockchain.

An embodiment of the present invention further provides a blockchain-based system for processing a traffic violation event configured to implement the blockchain-based method for processing a traffic violation event, and the system includes:

a reporting information obtaining module configured to obtain traffic violation reporting information provided by a first vehicle node stored in a blockchain;

an evidence data obtaining module configured to obtain an associated evidence data identifier in the traffic violation reporting information, and obtain, according to the evidence data identifier, evidence data provided by a second vehicle node stored in the blockchain; and a reporting information determining module configured to determine, according to the traffic violation reporting information and the associated evidence data, whether the traffic violation reporting information is valid.

An embodiment of the present invention further provides a blockchain-based device for processing a traffic violation event, including:

a processor; and a memory storing an executable instruction of the processor; where the processor is configured to perform steps of the blockchain-based method for processing a traffic violation event by executing the executable instruction.

The blockchain-based method and system for processing a traffic violation event provided in the present invention have the following advantages:

In the present invention, each vehicle node in the blockchain automatically collects and determines a traffic violation, credible traffic violation determining is completed based on an intelligent contract, and credibility and tamper resistance of traffic violation determining are improved based on recording information of a plurality of associated blockchain nodes; and automatic vehicle collection and reporting mechanism can be implemented, facilitating bold reporting of traffic violations by everyone and joint maintaining of transportation, thereby reducing traffic violation events and traffic accidents.

DETAILED DESCRIPTION

Exemplary implementations are described more comprehensively with reference to the accompanying drawings. However, the exemplary implementations may be implemented in many forms and should not be understood as being limited to examples described herein. Rather, these implementations are provided, so that this disclosure is more comprehensive and complete, and the concept of the exemplary implementations is comprehensively conveyed to persons skilled in the art. The described features, structures, or characteristics may be combined in any suitable manner in one or more implementations.

In addition, the accompanying drawings are schematic illustrations of this disclosure and are not necessarily drawn to scale. The same reference numbers in the figures represent same or similar parts and repeated descriptions thereof are omitted. Some block diagrams in the accompanying figures show functional entities but are not necessarily corresponding to physically or logically independent entities. These functional entities may be implemented in a form of software, or in one or more hardware modules or integrated circuits, or may be implemented in different networks and/or processor apparatuses and/or microcontrollers.

Figure 1:
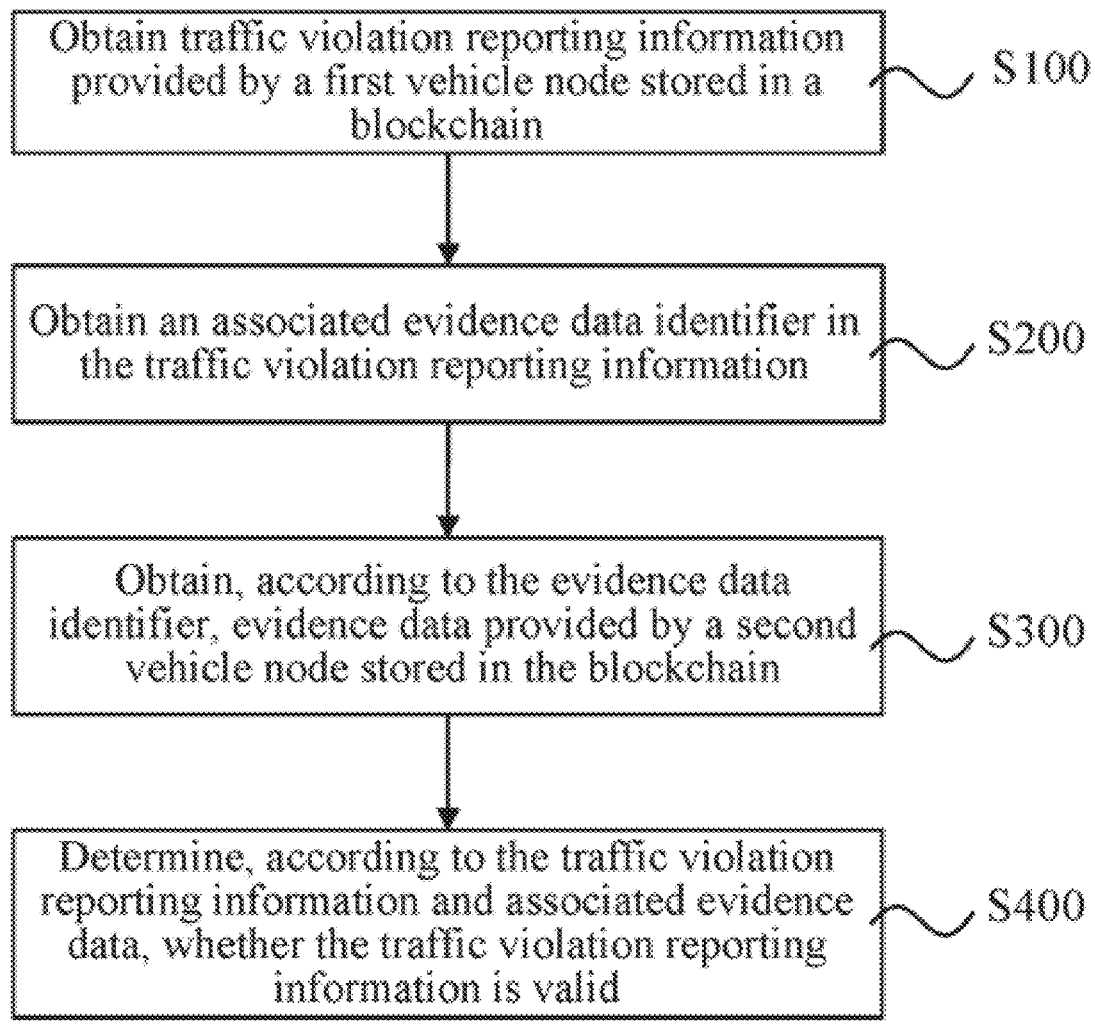
FIG. 1 is a flowchart of a blockchain-based method for processing a traffic violation event according to an embodiment of the present invention.

As shown in FIG. 1, in an embodiment of the present invention, the present invention provides a blockchain-based method for processing a traffic violation event, including the following steps:

S100: Traffic violation reporting information provided by a first vehicle node (which may be corresponding to vehicle that performs reporting) stored in a blockchain is obtained, the traffic violation reporting information including traffic violation event information, information about a vehicle in traffic violation, and an associated evidence data identifier, and the traffic violation event information including at least one type of information identifying a traffic violation event, such as a traffic violation event time, a traffic violation event position, and a traffic violation event type.

S200: The associated evidence data identifier in the traffic violation reporting information is obtained.

S300: Evidence data provided by a second vehicle node (which may be corresponding to vehicle that performs proving) stored in the blockchain is obtained according to the evidence data identifier, the evidence data including an evidence data identifier, traffic violation event information, and information about a vehicle in traffic violation that are of the evidence data.

Both the first vehicle node and the second vehicle node are vehicle nodes joining the Internet of Vehicles, and are used as an edge computing node that can communicate with a traffic violation blockchain, and can perform an edge computing function and store data in the blockchain. Therefore, in this embodiment, edge computing and blockchain technologies are combined, and the Internet of Vehicles and the blockchain are combined, to improve credibility and processing efficiency of traffic violation event processing. The first vehicle node may be corresponding to vehicle that performs reporting, and the second vehicle node may be corresponding to vehicle that performs proving. A vehicle is first registered to join the Internet of Vehicles to become a vehicle node, and then may identify and determine a traffic violation event according to a pre-set traffic violation event feature set. The traffic violation event may be automatically identified and determined directly using a processor of the vehicle, and therefore a driver does not need to perform manual intervention for identification and determining, so that a normal driving operation of the driver is not affected.

S400: It is determined whether the traffic violation reporting information is valid by invoking an intelligent contract for traffic violation determining and according to the traffic violation reporting information and the associated evidence data, and if the traffic violation reporting information is valid, a traffic violation event is successfully reported, and the traffic violation event is automatically processed by invoking a subsequent intelligent contract for traffic violation event processing, for example, a vehicle that performs reporting and a vehicle that performs proving are awarded, and a vehicle in traffic violation is punished.

The blockchain originates from a bitcoin basic algorithm and is a new application mode of computer technologies such as distributed data storage, point-to-point transmission, a consensus mechanism, an encryption algorithm, and the like. An intelligent contract means to realize terms and conditions in a transaction contract and perform transaction and asset transfer using logic of an application program when there is an information sharing requirement and an incredible multi-party interaction, mainly includes a resource state and program processing, and may be used to direct a blockchain to perform step procedures allocated by a series of pre-set operations. The intelligent contract itself is a participant in a blockchain system. In the present invention, each vehicle node in a vehicle network automatically collects and determines a traffic violation, and uploads reporting information and evidence data to a blockchain node, traffic violation reporting information and corresponding evidence data may be obtained from the blockchain through steps S100 to S300, and credible traffic violation determining may be automatically completed based on an intelligent contract through step S400, and credibility and tamper resistance of traffic violation determining is improved based on record information of a plurality of associated blockchain nodes.

In this embodiment, the determining whether the traffic violation reporting information is valid includes the following steps:

determining whether a quantity of second vehicle nodes providing the associated evidence data is greater than or equal to a pre-set first threshold; and if yes, determining that the traffic violation reporting information is valid, that is, determining that a traffic violation event in the traffic violation reporting information is valid.

In this embodiment, after the determining whether a quantity of second vehicle nodes providing the evidence data is greater than or equal to a pre-set first threshold, the method further includes the following steps.

If the quantity of second vehicle nodes providing the evidence data is less than the pre-set first threshold, the traffic violation reporting information is sent to an event auditor terminal, specifically, may be sent to a plurality of event auditor terminals.

It is determined whether a quantity of received auditing results of traffic violation confirmation is greater than a pre-set second threshold. Herein, a value of the pre-set second threshold is less than a quantity of event auditor terminals receiving the traffic violation reporting information.

If yes, it is determined that a traffic violation event in the traffic violation reporting information is valid, that is, a traffic violation event in the traffic violation reporting information is valid, and reporting from the first vehicle node is true.

Otherwise, it is determined that a traffic violation event in the traffic violation reporting information is invalid, and reporting from the first vehicle node is false.

In this embodiment, the blockchain-based method for processing a traffic violation event further includes the following steps.

The first vehicle node collects a road image, and sends a proving request to the second vehicle node when a traffic violation event is detected in the road image, the proving request including information about a to-be-proved vehicle in traffic violation and information about a to-be-proved traffic violation event. Herein, the first vehicle node may perform matching according to a pre-set traffic violation event feature set when detecting a traffic violation event in the road image, for example, performs image comparison, or performs determining using a trained artificial intelligence model for traffic events. The artificial intelligence model for traffic events may be a deep learning model trained in advance using a plurality of pictures of traffic violation events.

The second vehicle node receiving the proving request collects an image of the to-be-proved vehicle in traffic violation and determines whether there is a traffic violation event consistent with the proving request. Similarly, the second vehicle node may also perform matching according to the pre-set traffic violation event feature set, for example, performs image comparison, or performs determining using the trained artificial intelligence model for traffic events.

If yes, the second vehicle node stores the evidence data in the blockchain and sends the evidence data identifier to the first vehicle node.

The first vehicle node stores the traffic violation reporting information in the blockchain.

Figure 2:
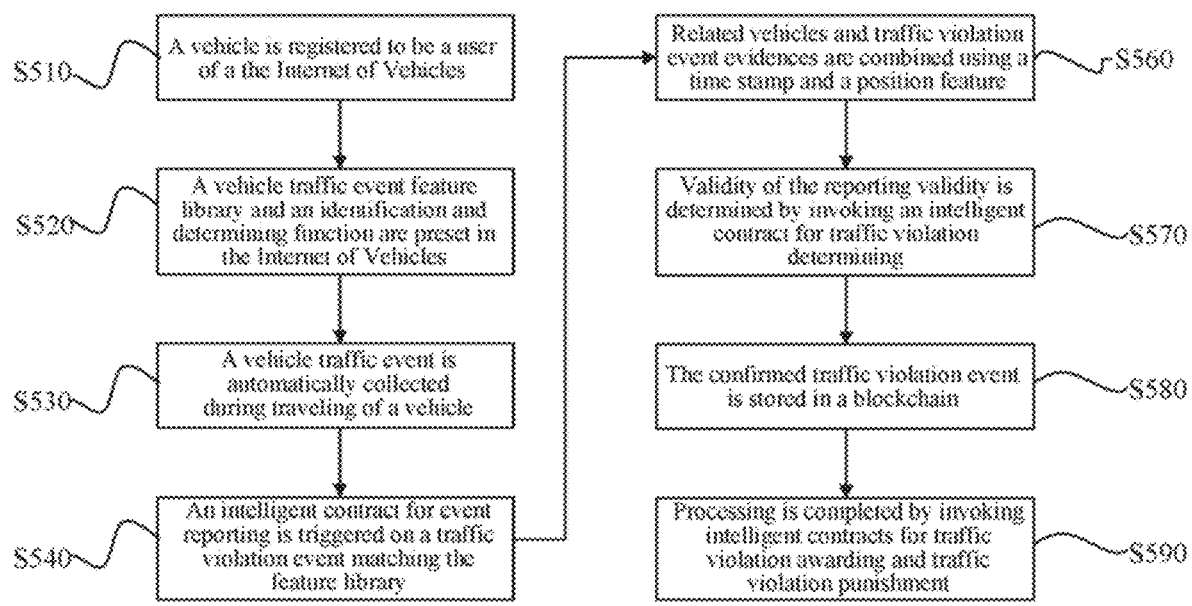
FIG. 2 and FIG. 3 are specific flowcharts of a blockchain-based method for processing a traffic violation event according to an embodiment of the present invention.
Figure 3:
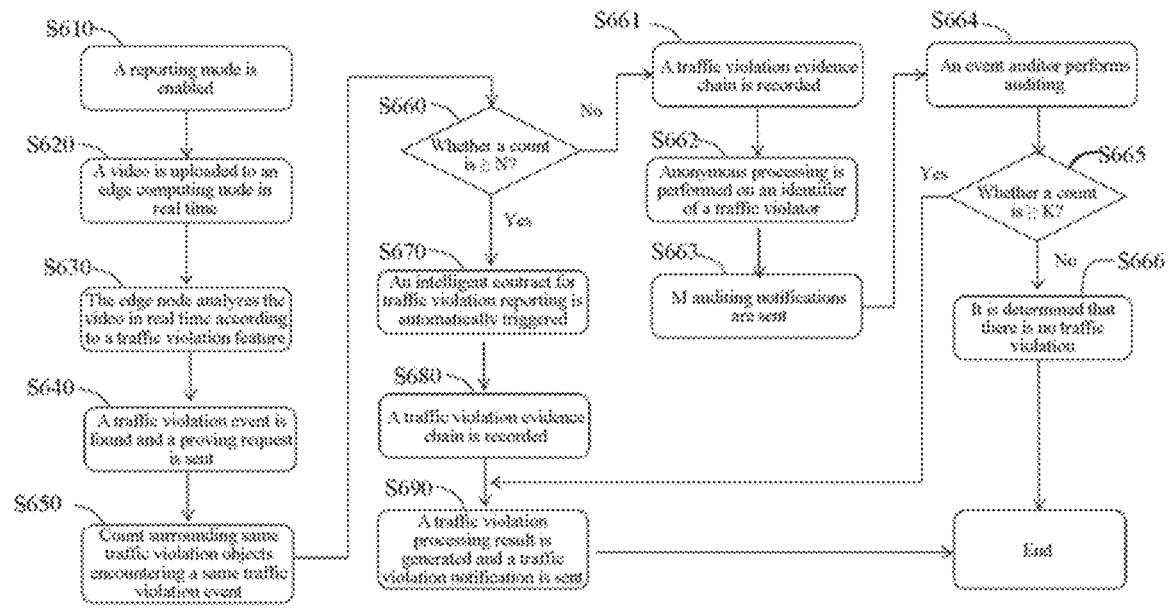

Therefore, in this embodiment, the blockchain-based method for processing a traffic violation event may be specifically implemented using procedures shown in FIG. 2 and FIG. 3. First, in S510, a vehicle is registered to be a user of the Internet of Vehicles, to become an edge computing node in the Internet of Vehicles. In S520, in the Internet of Vehicles, a vehicle traffic event feature set and identification and determining functions are pre-set. In S530, the edge computing node automatically collects traffic event data during traveling, for example, takes pictures using a camera, etc., and in S540, the edge computing node triggers an intelligent contract for event reporting on a traffic violation event matching the feature set. In S560 to S590, after the traffic violation reporting information and the evidence data are obtained, relevant vehicles and evidence data may be combined according to timestamp and a position feature, and then it is determined whether a reported traffic violation event is valid by invoking an intelligent contract for traffic violation determining. In FIG. 3, steps S610 to S690 are more detailed determining criteria corresponding to FIG. 2, N is the pre-set first threshold, M is a number of event auditors receiving an audit notification, and K is the pre-set second threshold. Values of N, M, and K may be set as required. In this embodiment, after the determining that the traffic violation reporting information is valid, the method further includes a step of awarding the vehicle that performs reporting and the vehicle that performs proving, to encourage more vehicles to join the Internet of Vehicles as a node and to report a traffic violation event boldly. In addition, the method may further include a step of automatically punishing a vehicle in a traffic violation.

Figure 4:
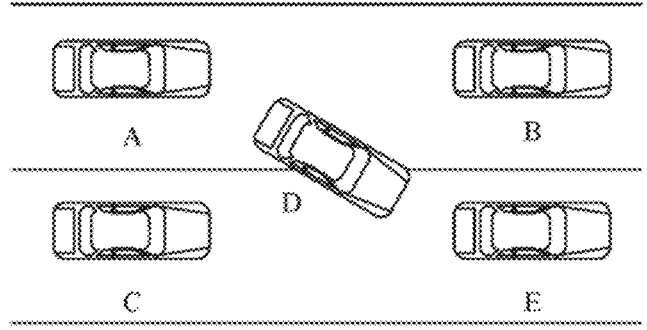
FIG. 4 is a schematic diagram of a road in a blockchain-based process of determining a traffic violation event according to an embodiment of the present invention.

For example, as shown in FIG. 4, a photograph of a vehicle D is taken by a front-facing camera of a vehicle B during driving, and a traffic violation event (such as a lane change across a solid line or a lane change without a turn signal) is identified. The vehicle B triggers a traffic violation reporting mechanism. The vehicle B sends a proving request to surrounding vehicles, or other vehicles synchronously find the traffic violation event of the vehicle D. After an image of the vehicle D image is collected by a vehicle A and a vehicle C using a rear-facing camera and by a vehicle E using a front-facing camera after the proving request is received, a traffic violation event is also identified, evidence data is generated and uploaded to the blockchain, and an evidence data identifier is fed back to the vehicle B. The vehicle B uploads the traffic violation reporting information and the evidence data identifier to the blockchain, the traffic violation reporting information being a traffic violation evidence collected by the vehicle B, and the evidence data identifier directing to a traffic violation evidence collected by other vehicles. If a quantity of corresponding vehicles that perform proving by invoking the intelligent contract for traffic violation determining is greater than or equal to the pre-set first threshold, it is determined that the vehicle D in traffic violation is in traffic violation. If the quantity is less than the pre-set first threshold, evidence data (which may include an evidence provided by the vehicle that performs reporting and an evidence provided by the vehicle that performs proving) related to traffic violation of the vehicle D is sent to a terminal of the event auditor, to ask the event auditor to perform auditing and determining.

As shown in FIG. 4, in this embodiment, the method for processing a traffic violation event may be mainly divided into three parts: event reporting, traffic violation awarding and punishment, and punishment implementation. For event reporting, an event reporting manner shown in FIG. 2 may be used to upload traffic violation reporting information to the blockchain. After a vehicle is registered to be a user of the Internet of Vehicles, authentication is performed on information of the vehicle, and the information of the vehicle is uploaded to the blockchain. In order to fully guarantee privacy of a vehicle that performs reporting, when the first vehicle node stores the traffic violation reporting information in the blockchain, the method further includes: after encrypting information about the first vehicle node in the traffic violation reporting information using a private key, storing, by the first vehicle node, the traffic violation reporting information in the blockchain, so that traffic violation is reported in an anonymous manner, thereby facilitating bold reporting of traffic violations by everyone and joint maintaining of transportation. For traffic violation awarding and punishment, a traffic violation event may be determined using an intelligent contract for traffic violation determining. After confirmation, awarding and punishment manners may be determined using an intelligent contract for traffic violation awarding and punishment, and a determining result is uploaded to the blockchain. A traffic violation event determining rule and an awarding and punishment processing rule may be set and delivered by a traffic violation processing part. The traffic violation event determining rule may be delivered to each vehicle node. Each vehicle node determines, according to the traffic violation event determining rule, whether a traffic violation event is detected. After a punishment manner is determined according to the intelligent contract for traffic violation awarding and punishment, punishment is implemented by invoking an intelligent contract for punishment processing, and a punishment result is uploaded to the blockchain.

Figure 5:
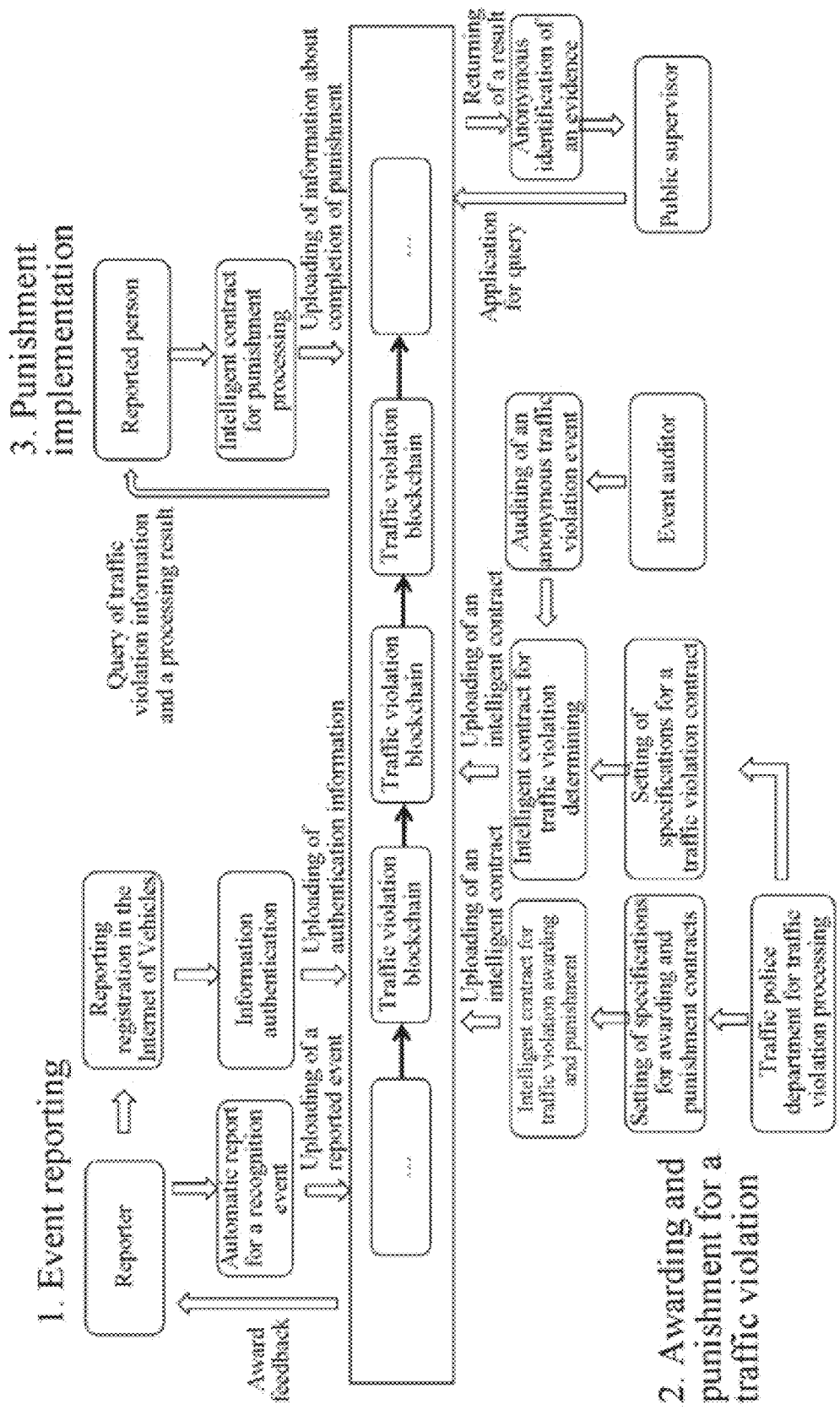
FIG. 5 is a schematic diagram of interaction with a blockchain in a blockchain-based method for processing a traffic violation event according to an embodiment of the present invention.

In addition, as shown in FIG. 5, in the method for processing a traffic violation event, a channel for public supervision may also be provided. Public supervisors may apply for querying information about traffic violation event punishment and obtain data such as some images related to a traffic violation event. To further guarantee privacy of a reported vehicle in traffic violation, during storage of information about the vehicle in traffic, vehicle identification information of the vehicle in traffic violation is identified, and then after anonymous processing is performed on the vehicle identification information, data of the vehicle in traffic violation obtained after anonymous processing is stored in the blockchain. In addition, in this embodiment, that the traffic violation reporting information is sent to the event auditor terminal may further include: identifying vehicle identification information in the traffic violation reporting information, and after anonymous processing is performed on the vehicle identification information, sending the traffic violation reporting information obtained after anonymous processing to the event auditor terminal. Therefore, anonymous processing on an identity of the vehicle in traffic violation can be implemented, for example, covering a license number, replacing a colour/a type of the vehicle, etc., to ensure privacy of the reported vehicle.

Figure 6:
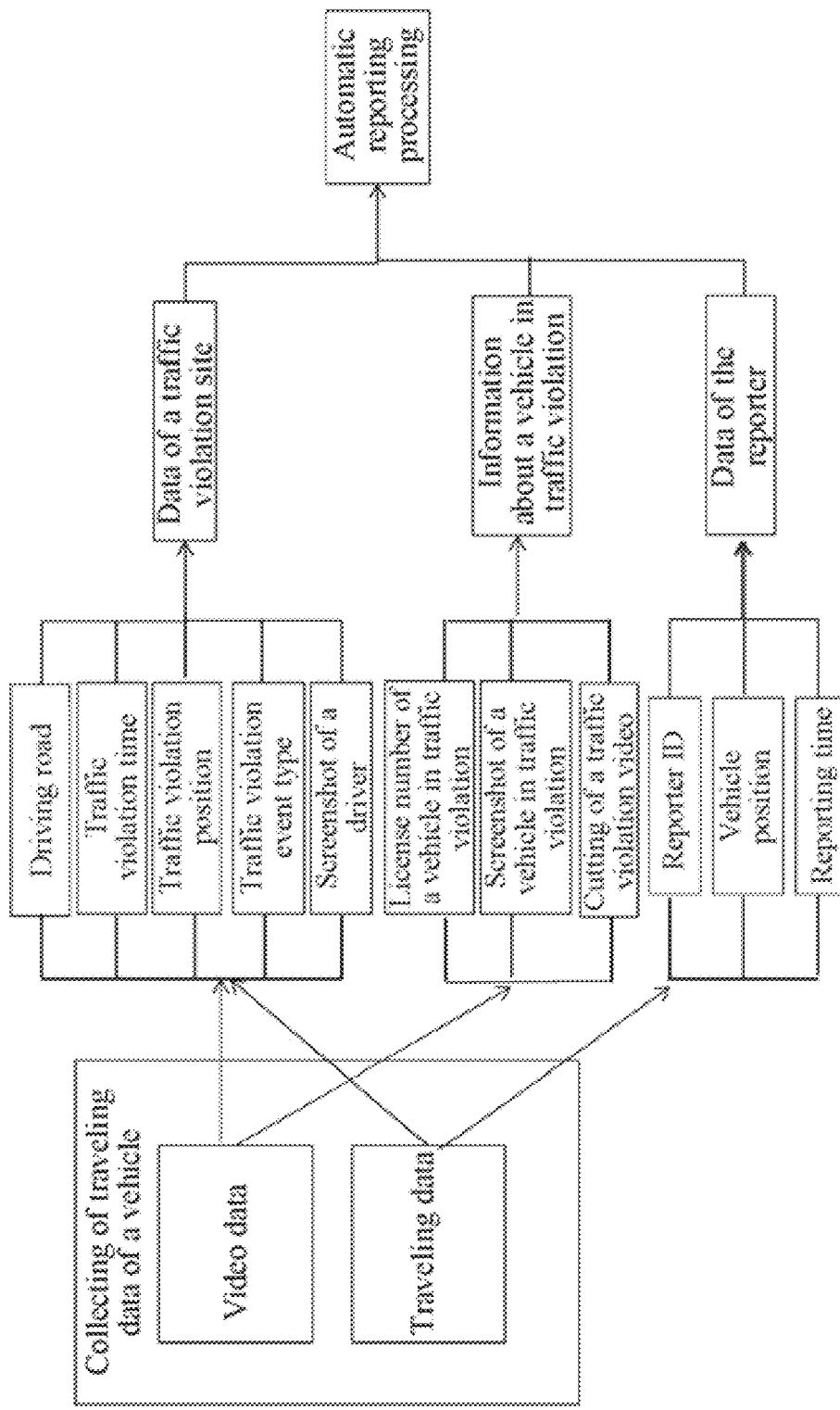
FIG. 6 is a schematic diagram of traveling data automatically collected by a vehicle node in a traveling process according to an embodiment of the present invention.

In this embodiment, content of data collected by the vehicle node during traveling is shown in FIG. 6. Further, in order to ensure authenticity of the data collected by the vehicle node, automatic collecting and automatic uploading by hardware is used, and a position of the reported vehicle is synthetically determined using the Internet of Vehicles. In addition, an evidence may be obtained using traffic police infrastructure.

Figure 7:
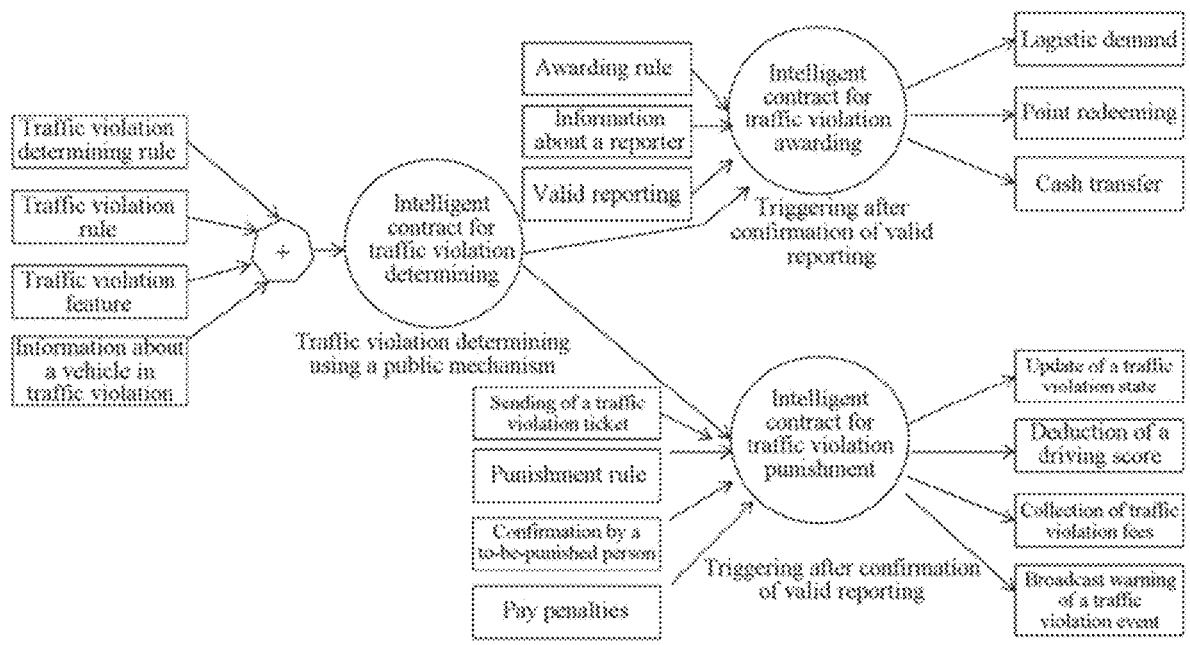
FIG. 7 is a schematic diagram of intelligent contracts in a method for processing a traffic violation event according to an embodiment of the present invention.
Figure 8:
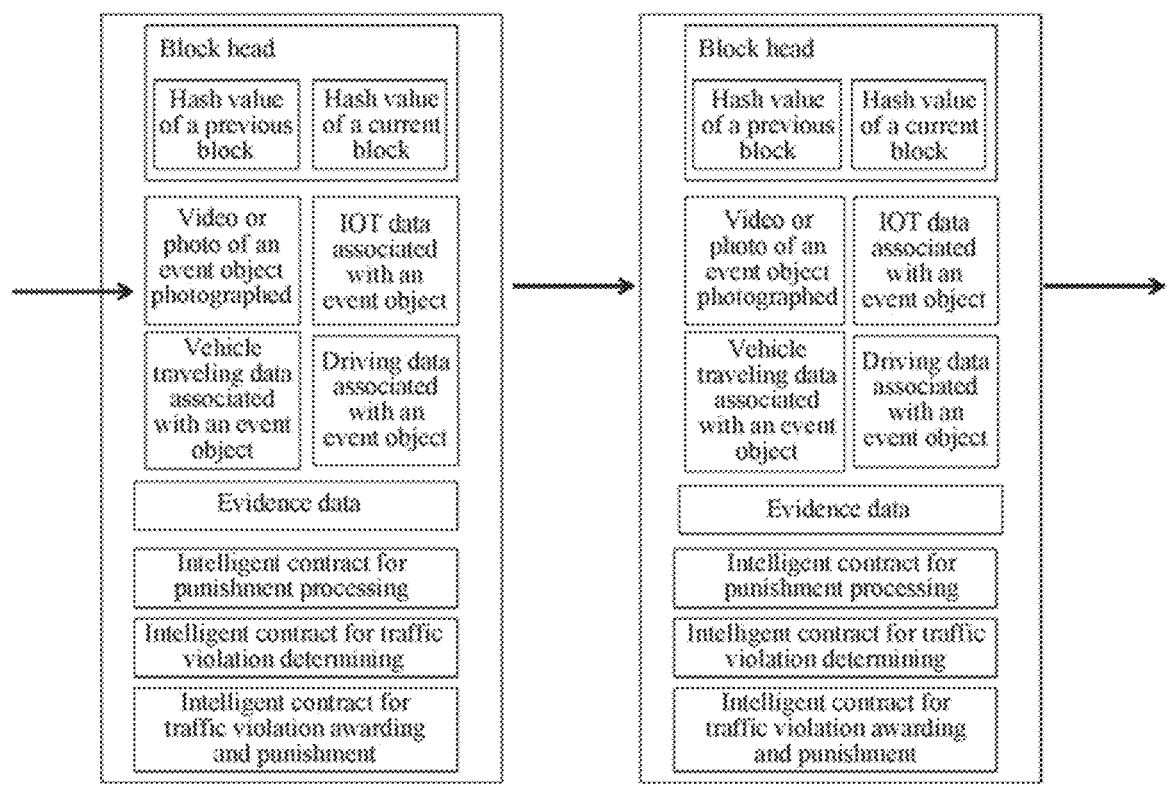
FIG. 8 is a schematic structural diagram of a blockchain existing when various intelligent contracts and data are applied to the blockchain according to an embodiment of the present invention.

FIG. 7 is a schematic diagram of various intelligent contracts used in this embodiment. FIG. 8 is a schematic structural diagram of a blockchain existing when various intelligent contracts and data are applied to the blockchain. An intelligent contract for traffic violation determining is mainly to determine whether there is traffic violation according to traffic violation reporting information, evidence data, and an auditing result of an event auditor. An intelligent contract for traffic violation punishment and an intelligent contract for traffic violation awarding are triggered after traffic violation confirmation, to respectively perform punishment on a vehicle in traffic violation and awarding on a reporter and an awarded person.

Figure 9:
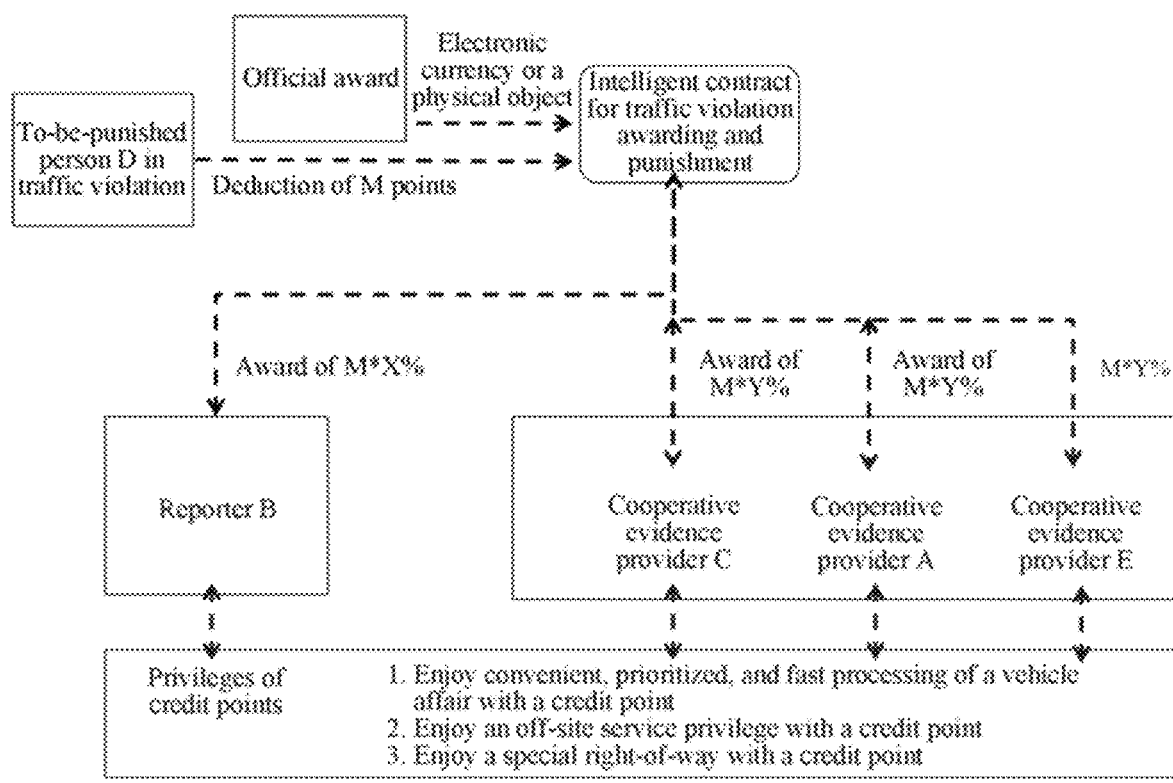
FIG. 9 is a flowchart of punishment and awarding performed using an intelligent contract for traffic violation punishment and an intelligent contract for traffic violation awarding according to an embodiment of the present invention.

FIG. 9 is a flowchart of punishment and awarding performed using an intelligent contract for traffic violation punishment and an intelligent contract for traffic violation awarding according to an embodiment. Herein, a reporting example in FIG. 4 is used. After finding a traffic violation event and sending a proving request, a reporter B obtains traffic violation evidences respectively provided by cooperative reporters C, A, and E. When the intelligent contract for traffic violation awarding is invoked, award points for a reporter and an evidence provider are calculated according to a pre-set award allocation formula X %+N*Y %=100% (N is a quantity of cooperative evidences providers or a quantity of evidence providers who are also reporters) for the reporter/the evidence provider. An award point may be point plus electronic money or a possible physical object. A credit point may be used to enjoy convenient, prioritized, and fast processing of a vehicle affair, to enjoy an off-site service privilege, and to enjoy a special right-of-way, etc.

For the to-be-punished person D in traffic violation, the intelligent contract for traffic violation punishment is invoked to deduct a point of the to-be-punished person in traffic violation, and different amounts at which the point is deducted may be determined according to severity of a traffic violation event.

Figure 10:
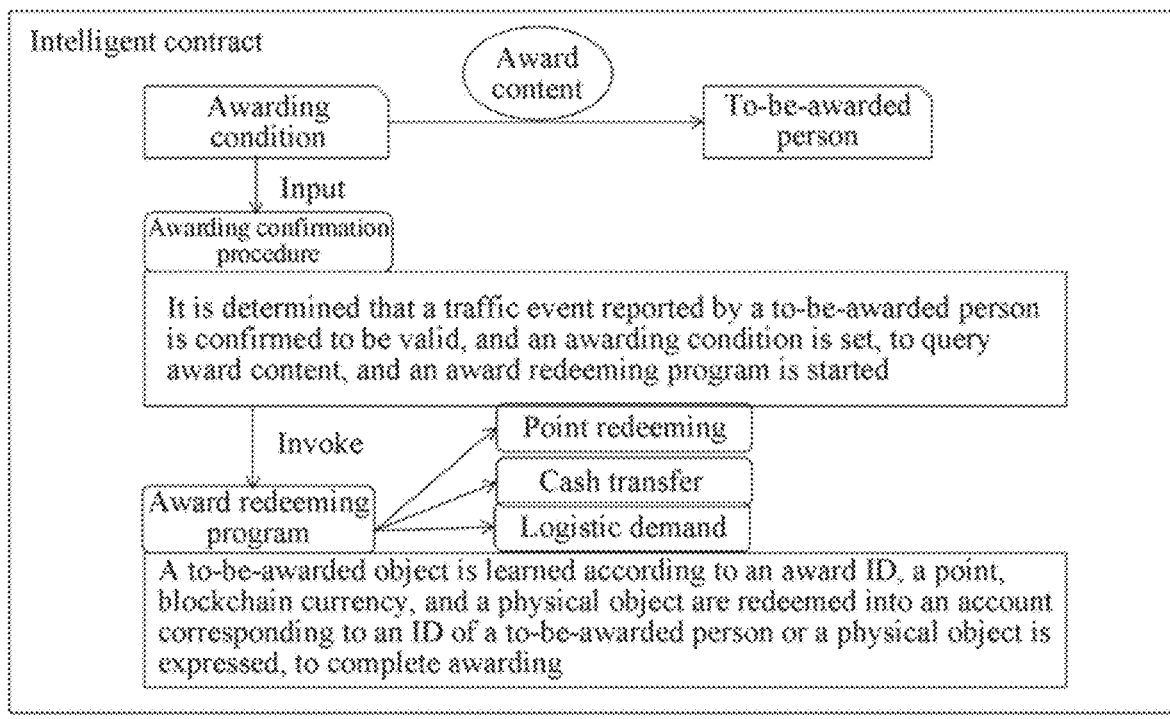
FIG. 10 is a flowchart of specific implementation of awarding for traffic violation reporting according to an embodiment of the present invention.

FIG. 10 is a flowchart of a specific implementation of awarding for reporting award according to this embodiment. Award content may be a point, blockchain currency, or a physical object, etc. After an award redeeming procedure is started, point redeeming, cash transfer, or initiation of a logistic demand for expressing a physical object is implemented using the award redeeming procedure, thereby completing awarding.

Figure 11:
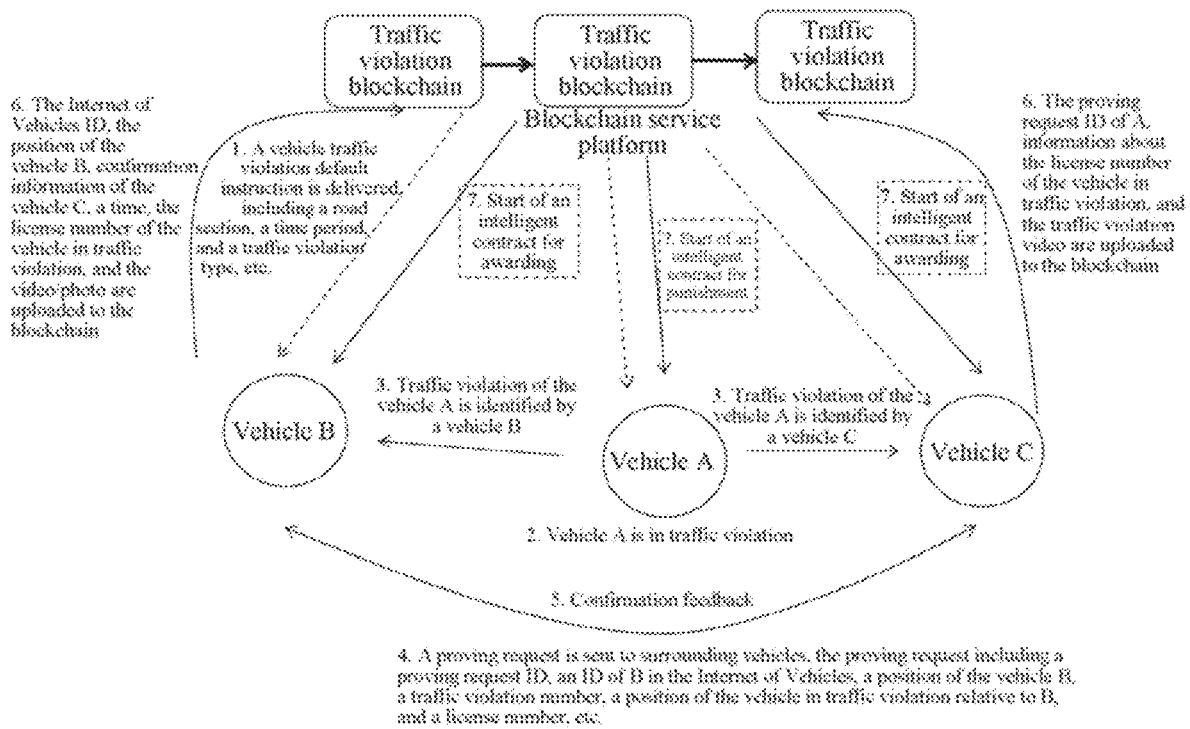
FIG. 11 is a flowchart of a method for processing a traffic violation event according to another embodiment of the present invention.

FIG. 11 is a flowchart of a method for processing a traffic violation event according to another embodiment of the present invention. In this embodiment, first, a blockchain service platform delivers a vehicle traffic violation default instruction, that is, delivers a vehicle violation determining rule, including a road section, a time period, and a violation type, etc. A vehicle A encounters a violation event, for example, cuts in, changes a lane change across a solid lane, and occupies a bus lane during peak hours, etc. A vehicle B and a vehicle C detect the violation of the vehicle A, and the vehicle B initiates reporting and initiates a proving request to surrounding vehicles. The vehicle B may send, in a V2V manner, a proving request including a proving request ID, an ID of the vehicle B, a position of the vehicle B, a violation code, and the like. The vehicle C sends a confirmation feedback to the vehicle B and uploads the proving request ID of the violation of the vehicle A and a license number of the vehicle in traffic violation to the blockchain. The vehicle B uploads reporting information and an evidence data identifier to the blockchain after receiving the confirmation feedback from other vehicles. After confirming a violation by invoking the intelligent contract, the blockchain service platform invokes the intelligent contract for traffic violation awarding and the intelligent contract for traffic violation punishment to award the vehicle B and the vehicle C and punish the vehicle A.

Figure 12:
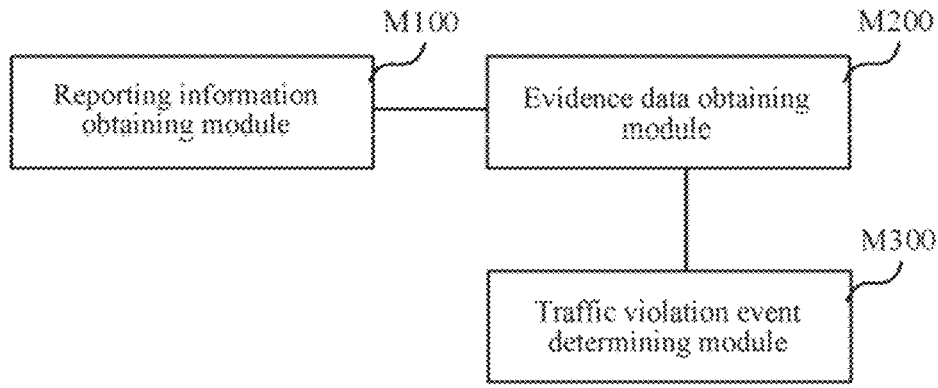
FIG. 12 is a schematic structural diagram of a blockchain-based system for processing a traffic violation event according to an embodiment of the present invention.

As shown in FIG. 12, an embodiment of the present invention further provides a blockchain-based system for processing a traffic violation event configured to implement the blockchain-based method for processing a traffic violation event, and the system includes:

a reporting information obtaining module M100 configured to obtain traffic violation reporting information provided by a first vehicle node stored in a blockchain;

an evidence data obtaining module M200 configured to: obtain an associated evidence data identifier in the traffic violation reporting information, and obtain, according to the evidence data identifier, evidence data provided by a second vehicle node stored in the blockchain; and a reporting information determining module M300 configured to: determine, according to the traffic violation reporting information and associated evidence data, whether the traffic violation reporting information is valid.

In this embodiment, a function of each module may be implemented using an implementation of each step of the foregoing blockchain-based method for processing a traffic violation event, for example, a function of the reporting information obtaining module M100 may be implemented according to a specific implementation of the foregoing step S100, the evidence data obtaining module M200 may be implemented according to specific implementations of the foregoing steps S200 and S300, and the reporting information determining module M300 may be implemented according to a specific implementation of the foregoing step S300. Details are not described herein.

Figure 13:
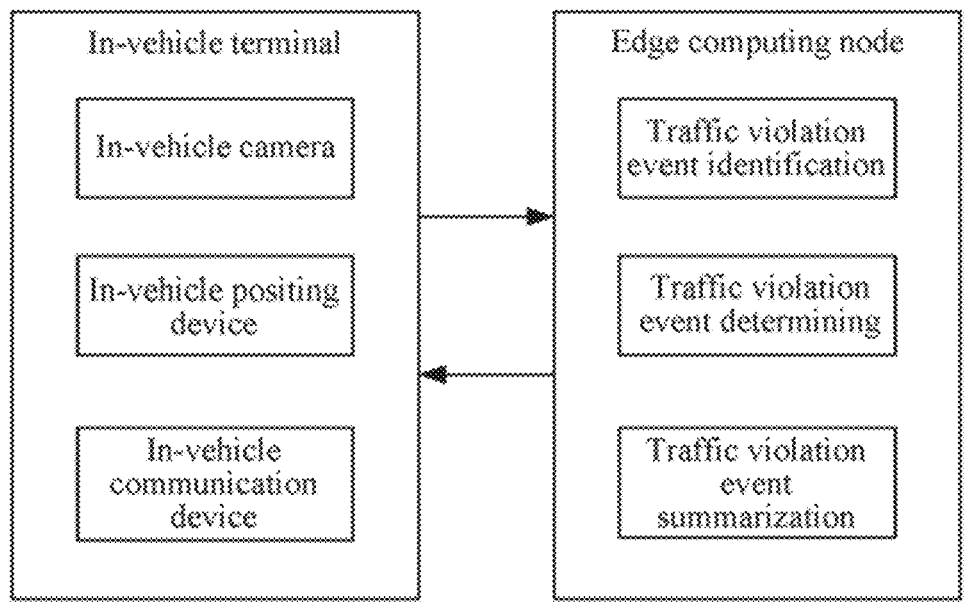
FIG. 13 is a schematic diagram of an in-vehicle terminal and an edge computing node associated with a system for processing a traffic violation event according to an embodiment of the present invention.

FIG. 13 is a schematic diagram of interaction between an in-vehicle terminal and an edge computing node associated with a system for processing a traffic violation event. An in-vehicle terminal 700 in a hardware form is disposed on a vehicle, including an in-vehicle camera 710 for collecting a road image, an in-vehicle positioning device 720 for obtaining vehicle position data, an in-vehicle communication device 730 for external communication, and the like, and the in-vehicle terminal 700 can communicate with the edge computing node 800. The edge computing node 800 includes traffic violation event identification 810, traffic violation event determining 820, and traffic violation event summarization 830. That is, the edge computing node 800 is corresponding to a first vehicle node and a second vehicle node, and can identify a traffic violation event according to an image (traffic violation event identification 810), determine whether a traffic violation event is valid by integrating reporting information and evidence data (traffic violation event determining 820), and summarize traffic violation events (traffic violation event summarization 830), etc. The edge computing node 800 may be disposed on each vehicle and consists of a processor. The processor is responsible for invoking each intelligent contract to perform computing and determining procedures.

Figure 14:
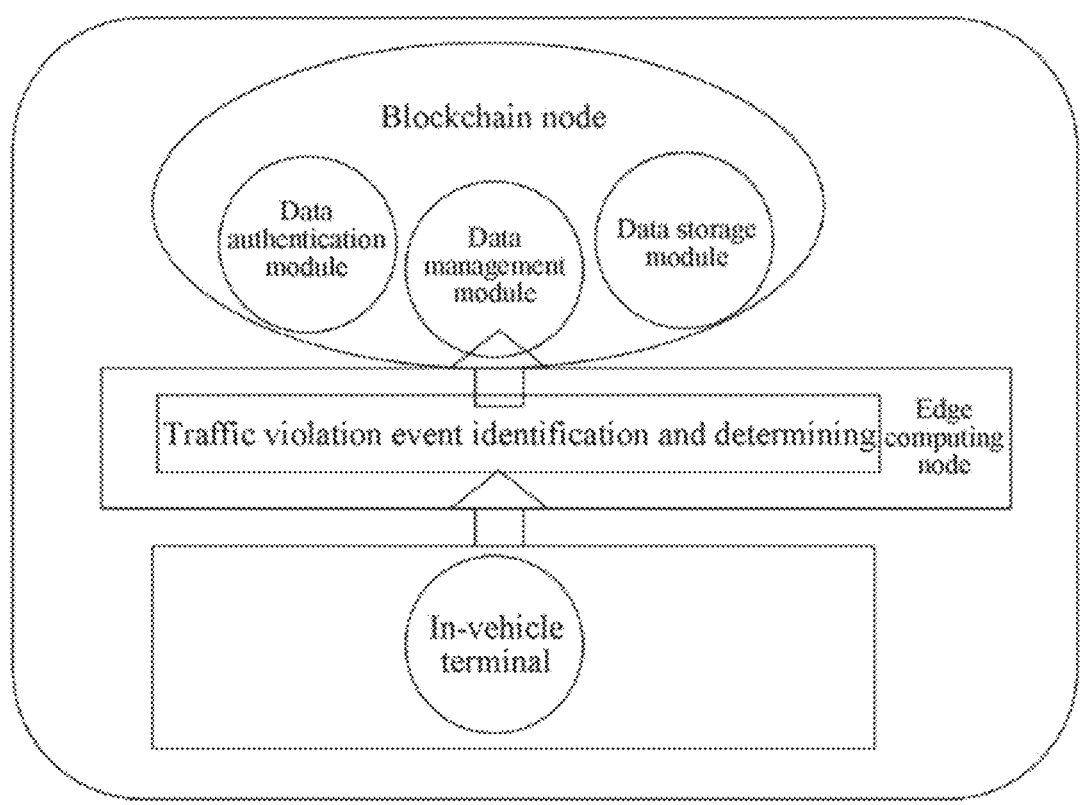
FIG. 14 is a schematic diagram of application of a system for processing a traffic violation event to a blockchain according to an embodiment of the present invention.

FIG. 14 is a schematic diagram of interaction among an edge computing node, a blockchain node, and an in-vehicle device. The edge computing node 800 is configured to identify a traffic violation event according to an image, determine whether a traffic violation event is valid by integrating reporting information and evidence data, and summarize traffic violation events, that is, traffic violation event identification and summarization 801. The blockchain node 900 may include a data authentication module 910, a data management module 920, and a data storage module 930. Blockchain nodes can communicate with each other to implement decentralized management of a blockchain, and the edge computing node 800 can communicate with an in-vehicle terminal 700. A composition structure of the in-vehicle terminal 700 may be shown in FIG. 13, that is, include an in-vehicle camera 710, an in-vehicle positioning device 720, and an in-vehicle communication device 730.

The blockchain-based method and system for processing a traffic violation event provided in the present invention have the following advantages:

In the present invention, each vehicle node in the blockchain automatically collects and determines a traffic violation, credible traffic violation determining is completed based on an intelligent contract, and credibility and tamper resistance of traffic violation determining are improved based on recording information of a plurality of associated blockchain nodes; and automatic vehicle collection and reporting mechanism can be implemented, facilitating bold reporting of traffic violations by everyone and joint maintaining of transportation, thereby reducing traffic violation events and traffic accidents.

Although the present invention has been disclosed above with reference to the foregoing embodiments, the embodiments are not intended to limit the present invention. Any equivalent replacements of modifications and improvements made by a person skilled in the art without departing from the spirit and the scope of the present invention shall fall within the protection scope of the present invention.

What is claimed is:

1. A blockchain-based method for processing a traffic violation event, comprising the following steps:
    obtaining traffic violation reporting information provided by a first vehicle node stored in a blockchain;
    obtaining an associated evidence data identifier in the traffic violation reporting information;
    obtaining, according to the evidence data identifier, evidence data provided by a second vehicle node stored in the blockchain;
    determining, according to the traffic violation reporting information and the associated evidence data, whether the traffic violation reporting information is valid;
    determining, according to the traffic violation reporting information and the associated evidence data, whether the traffic violation reporting information is valid;
    determining whether a quantity of second vehicle nodes providing the associated evidence data is greater than or equal to a preset first threshold, if the quantity of second vehicle nodes providing the evidence data is less than the preset first threshold;
    identifying vehicle identification information in the traffic violation reporting information, and after anonymous processing is performed on the vehicle identification information, sending the traffic violation reporting information obtained after anonymous processing to an event auditor terminal; and
    determining validity of the traffic violation reporting information according to an auditing result of the event auditor terminal.

2. The blockchain-based method for processing a traffic violation event according to claim 1, wherein if the quantity of second vehicle nodes providing the evidence data is less than the preset first threshold, sending the traffic violation reporting information to a plurality of event auditor terminals; and
    the determining validity of the traffic violation reporting information according to an auditing result of the event auditor terminal comprises the following steps:
    determining whether a quantity of received auditing results of traffic violation confirmation is greater than a preset second threshold; and
    if yes, determining that a traffic violation event in the traffic violation reporting information is valid; or
    otherwise, determining that a traffic violation event in the traffic violation reporting information is invalid.

3. The blockchain-based method for processing a traffic violation event according to claim 1, wherein the traffic violation reporting information comprises traffic violation event information, information about a vehicle in traffic violation, and an associated evidence data identifier, the evidence data comprises an evidence data identifier, traffic violation event information, and information about a vehicle in traffic violation that are of the evidence data, and the traffic violation event information comprises at least one of a traffic violation event time, a traffic violation event position, and a traffic violation event type.

4. The blockchain-based method for processing a traffic violation event according to claim 3, wherein the method further comprises the following steps:
    collecting, by the first vehicle node, a road image, and sending a proving request to the second vehicle node when a traffic violation event is detected in the road image, the proving request comprising information about a to-be-proved vehicle in traffic violation and information about a to-be-proved traffic violation event;
    collecting, by the second vehicle node receiving the proving request, an image of the to-be-proved vehicle in traffic violation, and determining whether there is a traffic violation event consistent with the proving request;
    if yes, storing, by the second vehicle node, the evidence data in the blockchain, and sending the evidence data identifier to the first vehicle node; and
    storing, by the first vehicle node, the traffic violation reporting information in the blockchain.

5. The blockchain-based method for processing a traffic violation event according to claim 4, when the first vehicle node stores the traffic violation reporting information in the blockchain, comprising: after encrypting information about the first vehicle node in the traffic violation reporting information using a private key, storing, by the first vehicle node, the traffic violation reporting information in the blockchain.

6. The blockchain-based method for processing a traffic violation event according to claim 1, after the determining that the traffic violation reporting information is valid, further comprising the following steps:
    counting a quantity of second vehicle nodes providing an evidence material; and allocating, according to a preset point allocation rule for vehicle reporting and vehicle proving, award points to the first vehicle node and the second vehicle node that provides the evidence material.

7. The blockchain-based method for processing a traffic violation event according to claim 1, after the determining that the traffic violation reporting information is valid, further comprising the following steps:

processing a vehicle in traffic violation according to a preset traffic violation processing rule and storing a processing result in the blockchain.

8. A blockchain-based system for processing a traffic violation event configured to implement the blockchain-based method for processing a traffic violation event according to claim 1, wherein the system comprises:

a reporting information obtaining module configured to obtain traffic violation reporting information provided by a first vehicle node stored in a blockchain;

an evidence data obtaining module configured to: obtain an associated evidence data identifier in the traffic violation reporting information, and obtain, according to the evidence data identifier, evidence data provided by a second vehicle node stored in the blockchain; and a reporting information determining module configured to determine, according to the traffic violation reporting information and the associated evidence data, whether the traffic violation reporting information is valid.

* * * * *